United States Patent
Baba et al.

(10) Patent No.: US 11,601,601 B2
(45) Date of Patent: Mar. 7, 2023

(54) OPTICAL ARRAY FOR HIGH-QUALITY IMAGING IN HARSH ENVIRONMENTS

(71) Applicant: UT-Battelle, LLC, Oak Ridge, TN (US)

(72) Inventors: Justin S. Baba, Knoxville, TN (US); Philip R. Bingham, Knoxville, TN (US); David S. Bolme, Knoxville, TN (US); Matthew R. Eicholtz, Lakeland, FL (US); Regina Kay Ferrell, Knoxville, TN (US); Christi R. Johnson, Kingston, TN (US); Hector J. Santos-Villalobos, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/989,222

(22) Filed: Aug. 10, 2020

(65) Prior Publication Data
US 2021/0195086 A1    Jun. 24, 2021

Related U.S. Application Data

(63) Continuation of application No. 16/058,948, filed on Aug. 8, 2018, now Pat. No. 10,742,894.
(Continued)

(51) Int. Cl.
*H04N 5/235* (2006.01)
*G06T 5/00* (2006.01)
(Continued)

(52) U.S. Cl.
CPC .......... *H04N 5/2355* (2013.01); *G06T 5/002* (2013.01); *G06T 5/007* (2013.01); *G06T 5/008* (2013.01);
(Continued)

(58) Field of Classification Search
CPC ............ H04N 5/2355; G06K 9/00255; G06K 9/00785; G06K 9/00832; G06K 9/209;
(Continued)

(56) References Cited

U.S. PATENT DOCUMENTS 7,574,021 B2    8/2009  Matey
8,310,531 B2    11/2012 Nandy
(Continued)

FOREIGN PATENT DOCUMENTS

CN    202276422 U    6/2012
CN    104702971 A    6/2015
(Continued)

OTHER PUBLICATIONS

Holloway et al., "Generalized Assorted Camera Arrays: Robust Cross-channel Registration and Applications," *IEEE Transactions on Image Processing*, vol. 24, No. 3, pp. 823-835, Mar. 2015.
(Continued)

*Primary Examiner* — Wednel Cadeau
(74) *Attorney, Agent, or Firm* — Klarquist Sparkman, LLP

(57) ABSTRACT

Methods and apparatus are disclosed for producing high quality images in uncontrolled or impaired environments. In some examples of the disclosed technology, groups of cameras for high dynamic range (HDR), polarization diversity, and optional other diversity modes are arranged to concurrently image a common scene. For example, in a vehicle checkpoint application, HDR provides discernment of dark objects inside a vehicle, while polarization diversity aids in rejecting glare. Spectral diversity, infrared imaging, and active illumination can be applied for better imaging through a windshield. Preprocessed single-camera images are registered and fused. Faces or other features of interest can be detected in the fused image and identified in a library.
(Continued)

Impairments can include weather, insufficient or interfering lighting, shadows, reflections, window glass, occlusions, or moving objects.

17 Claims, 11 Drawing Sheets

Related U.S. Application Data

(60) Provisional application No. 62/544,329, filed on Aug. 11, 2017.

(51) Int. Cl.

| | | |
|---|---|---|
| *G06T 5/50* | (2006.01) | |
| *H04N 5/225* | (2006.01) | |
| *H04N 13/327* | (2018.01) | |
| *H04N 5/247* | (2006.01) | |
| *G06V 10/147* | (2022.01) | |
| *G06V 20/54* | (2022.01) | |
| *G06V 20/59* | (2022.01) | |
| *G06V 40/16* | (2022.01) | |
| *H04N 5/33* | (2006.01) | |

(52) U.S. Cl.
CPC .............. *G06T 5/50* (2013.01); *G06V 10/147* (2022.01); *G06V 20/54* (2022.01); *G06V 20/59* (2022.01); *G06V 40/166* (2022.01); *H04N 5/2256* (2013.01); *H04N 5/2258* (2013.01); *H04N 5/247* (2013.01); *H04N 13/327* (2018.05); *G06T 2207/10016* (2013.01); *G06T 2207/10024* (2013.01); *G06T 2207/10028* (2013.01); *G06T 2207/10048* (2013.01); *G06T 2207/20052* (2013.01); *G06T 2207/20076* (2013.01); *G06T 2207/20084* (2013.01); *G06T 2207/20208* (2013.01); *G06T 2207/20221* (2013.01); *G06T 2207/30201* (2013.01); *G06T 2207/30268* (2013.01); *H04N 5/33* (2013.01)

(58) Field of Classification Search
CPC ......... G06T 5/002; G06T 5/007; G06T 5/008; G06T 5/50
USPC ........................................................ 382/154
See application file for complete search history.

(56) References Cited

U.S. PATENT DOCUMENTS

| | | | |
|---|---|---|---|
| 8,811,811 | B1 | 8/2014 | Wetzel et al. |
| 9,122,925 | B2 | 9/2015 | Hanna |
| 9,600,887 | B2 | 3/2017 | Park et al. |
| 10,742,894 | B2 | 8/2020 | Baba et al. |
| 2001/0002216 | A1 | 5/2001 | Chuang et al. |
| 2004/0056966 | A1* | 3/2004 | Schechner ........... H04N 5/2355 348/229.1 |
| 2005/0071519 | A1* | 3/2005 | Hart ....................... G06K 15/00 710/8 |
| 2005/0185711 | A1 | 8/2005 | Pfister et al. |
| 2006/0208169 | A1* | 9/2006 | Breed ................ G06K 9/00624 250/221 |
| 2015/0009278 | A1* | 1/2015 | Modai .................... G06V 40/23 348/14.08 |
| 2015/0185000 | A1* | 7/2015 | Wilson ................... G06N 3/084 356/601 |
| 2017/0142312 | A1 | 5/2017 | Dal Mutto et al. |

FOREIGN PATENT DOCUMENTS

| | | | |
|---|---|---|---|
| CN | 106778682 A | | 5/2017 |
| CN | 107256394 A | * | 10/2017 |
| CN | 107256394 A | | 10/2017 |
| WO | WO 2016/041953 A1 | | 3/2016 |

OTHER PUBLICATIONS

Li et al., "Pixel-level image fusion: A survey of the state of the art," *Information Fusion*, vol. 33, pp. 100-112, Jan. 2017.

Mantiuk et al., "A Perceptual Framework for Contrast Processing of High Dynamic Range Images," 9 pages (also published as Mantiuk et al., "A Perceptual Framework for Contrast Processing of High Dynamic Range Images," *Proceedings of the 2nd symposium on Applied perception in graphics and visualization*, pp. 87-94, 2005).

Wilburn et al., "High Performance Imaging Using Large Camera Arrays," *ACM Transactions on Graphics (TOG)*, vol. 24, No. 3, pp. 765-776, Jul. 2005.

\* cited by examiner

OPTICAL ARRAY FOR HIGH-QUALITY IMAGING IN HARSH ENVIRONMENTS

CROSS-REFERENCE TO RELATED APPLICATIONS

This application is a Continuation of U.S. patent application Ser. No. 16/058,948, filed Aug. 8, 2018, which claims the benefit of U.S. Provisional Application No. 62/544,329, filed on Aug. 11, 2017, both of which applications are incorporated herein by reference in their entirety.

ACKNOWLEDGMENT OF GOVERNMENT SUPPORT

This invention was made with government support under Contract No. DE-AC05-00OR22725 awarded by U.S. Department of Energy. The government has certain rights in the invention.

BACKGROUND

Imaging applications continue to increase in areas as diverse as factory automation, surveillance, and autonomous vehicle computer vision. The successful deployment of many such applications can be dependent on the quality of a source image. Often, images must be acquired in poorly controlled conditions, with impairments in a scene that can include weather, sub-optimal ambient lighting, shadows, reflections, occlusions, or moving objects.

Existing approaches are limited in their ability to operate successfully in uncontrolled or harsh environments. Accordingly, there is ample opportunity for improved technology for imaging in uncontrolled or harsh conditions.

SUMMARY

Apparatus and methods are disclosed for imaging in a harsh environment using a camera array. In some examples of the disclosed technology, one subset of the camera array can provide exposure for high dynamic range (HDR) imaging, while another subset of the camera array can provide polarization diversity. In further examples, other modes of diversity can be used, such as spectral diversity, spatial diversity, or focus diversity. Raw images from the camera array can be preprocessed and then fused by associated computer processors. Active illumination can be used. A database can be coupled to the computer processors to provide face or object recognition.

According to one aspect, the disclosed technologies can be implemented as an inspection system for obtaining a fused image in an impaired environment. The inspection system includes one or more hardware computer processors, attached memory, computer-readable media storing instructions to be executed by the hardware processors, a first group of cameras, and a second group of cameras. The storage media and cameras are coupled to the hardware processors. Cameras of the first group are configured to collect light with exposure diversity, from which the inspection system is configured to form first images. Cameras of the second group are configured to collect light with polarization diversity, from which the inspection system is configured to form second images. The hardware processors are configured to execute the instructions, which causes the hardware processors to process raw images of the collected light to obtain the single-camera first images and second images, to register the first and second images, and to fuse the registered images to obtain the fused image.

In some examples, the inspection system can also include a third group of cameras configured to collect light having spectral diversity, with the inspection system configured to form third images therefrom. In such examples, the first, second, and third images can be registered together and subsequently fused. In further examples, processing the collected light or raw images by the hardware processors can include one or more of applying calibration, extending bit depth, or applying edge-preserving denoising. In additional examples, the hardware processors can be configured to detect a face in the fused image, and can extract a snippet from the fused image that includes the detected face. In some examples, the inspection system can include a network connection, which can be coupled to a server of a face database, and the processors can be configured to transmit the snippet to the server over the network connection. In additional examples, the computer-readable media can store a deep neural network model (DNN), and the processors can be configured to use the DNN to determine saturated pixels in one or more of the first images and second images, and to disregard saturated pixels during the registering or fusing. In further examples, the inspection system can include a pulsed light source, with the hardware processors configured to trigger the first cameras or second cameras in a timed relationship with the pulsed light source. The pulsed light source can be an infrared source, and at least one of the cameras can be configured to collect a portion of the infrared light. The impaired environment can include a moving window, such as the windshield of a moving vehicle, between the inspection system and a target feature, such as the face of a vehicle occupant. The impaired environment can include variable or uncontrolled ambient lighting.

In a second aspect, the disclosed technologies can be implemented as a method of imaging a scene. First cameras collect light of different respective exposures, from which respective first images of the scene are formed. Second cameras collect light of different respective polarizations, from which respective second images of the scene are formed. The first images and the second images are registered together. The registered images are fused into a fused image, which is output or stored.

In some examples, third cameras can collect light of different respective spectra, from which respective third images can be formed. Registering can include first, second, and third images. In additional examples, the collecting of light can produce raw images, and forming can include applying calibration, extending bit depth, or applying denoising, such as edge-preserving denoising. In further examples, the method can include identifying saturated pixels, in one or more of the first images and second images, to produce corresponding saturated pixel masks, which can be used as input to the fusing action.

In some examples, the scene can include a face in a vehicle, and the method can include detecting the face in the fused image, and matching the detected face in a face database. In further examples, the matching can include transmitting an image of the detected face from a computer local to the first cameras and second cameras, over a network, to a server of the face database. The matching can include identifying at least one person matching the detected face image in the face database, and transmitting an identification or an image of the matching person to the computer over the network.

In a further aspect, the disclosed technologies can be implemented as one or more computer-readable media storing executable instructions for image fusion. When executed by a hardware computer processor, first instructions trigger collection of first raw images of a scene by respective first cameras, the first raw images distinguished by respective amounts of light collected. Upon execution, second instructions trigger collection of second raw images of the scene by respective second cameras, the second raw images distinguished by respective polarization states of light collected. Third instructions preprocess the first raw images and second raw images to obtain respective first preprocessed images and second preprocessed images. Fourth instructions register the first preprocessed images and second preprocessed images to obtain respective first registered images and second registered images. Fifth instructions, upon execution, fuse the first registered images and second registered images to obtain a fused image and store the fused image.

In some examples, the computer-readable media can further store sixth instructions which, when executed by a computer processor, cause a data structure used for fusion to be tuned. Tuning of the data structure can lead to improved dynamic range or improved glare reduction in at least a portion of the fused image. In additional examples, additional instructions can trigger collection of third raw images by respective third cameras, the third raw images distinguished by respective spectra of light collected. In such examples, preprocessing, registration, and fusion can extend to raw images, preprocessed images, and registered images from the third cameras. In further examples, preprocessing can include identifying saturated pixels in a given image of the first and second images to produce a corresponding saturated pixel mask, and fusing can be based at least partly on the saturated pixel mask. In some additional examples, additional instructions can detect, from the fused image, a face of a vehicle occupant in the scene, and can transmit an image snippet of the detected face over a network to a facial recognition service. A photograph of a person, identified by the facial recognition service as matching the image snippet, can be received over the network and displayed locally.

The foregoing and other objects, features, and advantages of the invention will become more apparent from the following detailed description, which proceeds with reference to the accompanying figures.

DETAILED DESCRIPTION

Figure 1:
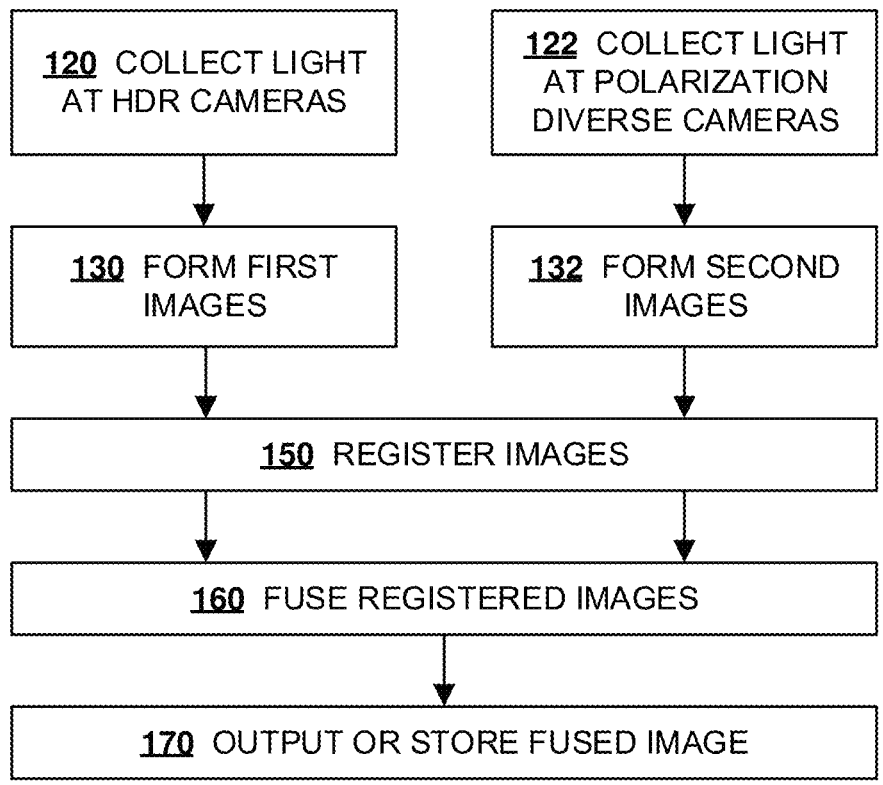
FIG. 1 is a flowchart of an example imaging method according to disclosed technologies.

This disclosure is set forth in the context of representative embodiments that are not intended to be limiting in any way.

INTRODUCTION

The disclosed technologies can be described in terms of an example problem of face recognition at a vehicle checkpoint. This problem has application to international border checkpoints, toll booths, gates to restricted access facilities, and carpool lanes, among others. Vehicle checkpoints are prone to many impairments, which have made it difficult to deploy automated systems until now. These impairments can include weather, variable sunlight, window glass reflections, tint, or occlusions, variable glare from other vehicles, variations between vehicles, variations between occupants, or variations in speed, in any combination. Further, these impairments can be uncontrolled.

Cameras having diverse light collection properties can be used to aid in overcoming such impairments.

Exposure diversity can aid in detecting faces in a dark interior of a vehicle in the presence of bright exterior features in a scene. Polarization diversity can aid in discriminating between constituents of a scene, for example, sunlight, reflections off windows and roadways, and vehicle interiors can all have different polarization properties. Spectral diversity can also aid in distinguishing objects in a scene, by taking advantage of spectral variation in window glass reflection and transmission, by selectively accepting light at wavelengths of active illumination, or by selectively rejecting light in wavelengths of background illumination. Spatial diversity can also aid in detecting a face, as the view from one orientation can be occluded, while the view from another orientation is more clear. Temporal diversity can be used to distinguish received light matching a temporal profile of active illumination from background light.

The diverse camera images can be preprocessed, registered, and fused to obtain high quality images, as described herein.

Terminology

As used herein, a "camera" is an apparatus for collecting light from a scene to form an image. A camera can be controlled or configured to selectively acquire light having particular exposure, polarization, spectral, or other attributes. In this disclosure, groups of cameras having diversity are of particular interest. While common cameras described in disclosed examples are stationary still cameras, this is not a requirement. A camera or a group of cameras can be mounted on a tracking stage having one or more degrees of freedom. Cameras can acquire bursts of images, or can be video cameras. In examples, defocused plenoptic cameras can be used.

As used herein, "detection" of an object in an image refers to an act of determining that an instance of the object is present in the image, and can also include determining a region of the image that bounds the object. Detection does not imply identification or recognition. For example, face detection can refer to determining that a face is present in an image without knowing whose face it is, while face "recognition" refers to determining the person whose face is in the image.

As used herein, "diversity" refers to variation among a group of cameras or among a group of images, which view a common scene with one or more configuration parameters being varied between cameras or between images. Commonly, exposure diversity, polarization diversity, spectral diversity, or spatial diversity can be used with the disclosed technologies, in varying combinations. In some examples, temporal diversity or diversity of illumination can also be applied. A benefit of diversity is that a feature can be more clearly discerned from one camera or in one image as compared to other cameras or images. In examples, a fused image formed from a set of diversity images can show a feature more clearly or with more contrast than any of the constituent diversity images.

As used herein, "exposure" can refer to the relative amount of light or light signal collected by a camera from a scene. Exposure can be configured by acquisition time, as a camera sensor acquiring an image over 20 ms will collect twice as much light as a camera sensor having an acquisition time of only 10 ms, other parameters being equal. Exposure can be configured by aperture setting, as a camera with an f-number of f-stop setting of f/4 will collect four times as much light as a camera with an f/8 aperture setting, other parameters being equal. Exposure can be configured by introduction of an optical component, such as a neutral density filter, into the optical path between the scene and the camera sensor. Increasing acquisition time can result in a side effect of motion blur, while increasing the aperture setting can have a side effect of decreased depth of field. Digital cameras also commonly incorporate an ISO setting, which controls the sensitivity of the imaging electronics, and can be implemented in different ways according to the camera architecture. Control of the ISO setting controls the light signal acquired, even though a change to an ISO setting may not directly affect the amount of light collected by the camera. Thus, exposure can also be controlled by adjustment of the ISO setting. These techniques can be applied singly or in any combination to collect images of a scene having exposure diversity. Exposure pertains to an imaged scene and not to a single pixel. In examples, a group of cameras or images having exposure diversity can differ in exposure, and possibly incidental differences due to cameras being distinct, but can have the same settings or substantially the same values for other optical parameters such as spectrum and polarization.

As used herein, "face" is the front side of the head of a person or animal, having at least an eye, and optionally extending from chin to head longitudinally or from temple to temple transversely. The term face can refer to an actual part of a human or animal body, or can refer to a partial or whole image of the face part of a body.

As used herein, "fusion" refers to the combination of multiple input images of a common scene into fewer "fused" images of the same scene, often just a single "fused" or "composite" image. Fusion is different from stitching together e.g. a panorama, from layering multiple images into a single file having distinct layers for respective input images that are only separately viewable, or from forming a montage in which individual input images are laid out side by side. Fusion operates at the pixel level or at the feature level. Pixel level fusion can determine a fused pixel value based at least partly on the same, neighboring, or proximate pixels from two or more input images.

As used herein, "high dynamic range (HDR)" imaging refers to formation of an image from constituent images having exposure diversity. A high-exposure image can allow discernment of features in portions of a scene having low light intensity but can saturate in high intensity portions of the scene. Conversely, a low-exposure image can allow features to be distinguished in high intensity portions of a scene, but can miss features in low intensity portions of the scene. By selective combination of two, three, or more images having exposure diversity, a composite HDR image can be produced having discernible features across a wider range of light intensities than any single constituent image. In some examples, the range representation can be compressed relative to a constituent image, while in other examples, the bit depth can be extended to accommodate the increased dynamic range. In further examples, a combination of range compression and bit depth extension can be used.

As used herein, "illumination" refers to any source of light that can be directly or indirectly collected by a camera. Illumination that can be present independent of any embodiment of the disclosed technology is termed background, ambient, or environmental illumination. Such illumination can be natural, e.g. sunlight, internal to the scene, e.g. a dome light inside a vehicle, or external to the scene, e.g. lights of a nearby building. Additionally, "active" illumination can be provided as part of the disclosed technology for the purpose of illuminating objects in the scene. Active illumination can have selected or configured attributes including, without limitation, position, orientation, diffusiveness, spectral content or color, polarization, or temporal profile. Regarding the latter, active illumination can be steady, pulsed singly during an image acquisition (like a flash), or pulsed in a coded manner synchronously with camera frame acquisition. Where active illumination is described as having a particular color (or, infrared), it can be understood that more than 50% of the emitted optical energy of the active illumination lies within the described spectral range; the spectral range for white light of any color temperature is 400-700 nm.

As used herein, an "image" is a representation of an array of digital pixel values representing a scene or portion thereof. The image representation can be uncompressed (e.g. a bitmap or BMP file) or compressed (e.g. portable network graphics, or PNG file). The image pixel values can indicate light intensities of the pixels in the scene, and can be unscaled, scaled according to a gamma curve, scaled or compressed for HDR, or otherwise mapped from intensities of collected light. Images can be monochromatic, color, or false color. Images can have associated metadata. Commonly, an image can be acquired by a camera, processed or generated by a hardware processor executing computer-readable instructions, stored on computer-readable media, transmitted over a network, or rendered on a display. A portion of an image, extracted from a region of the image, is sometimes dubbed a "snippet" to distinguish from the parent image.

As used herein, "light" is used as shorthand for optical radiation, which can be any electromagnetic radiation having free space wavelengths between about 100 nm and 10 µm, and typically between about 500 nm and 2 µm. Light need not be visible. Visible light can be detected by a typical human eye and has a free space wavelength between about 400 nm and about 700 nm. Light of shorter wavelengths is termed ultraviolet radiation, ultraviolet light, or simply UV for short. Light of longer wavelengths is termed infrared radiation, infrared light, or simply IR for short.

As used herein, "polarization" of light refers to the polarization state of the electric field of some given optical electromagnetic radiation. The light can include a mix of unpolarized light and polarized light. The electric field of polarized light can be a linear combination of constituent waves having different orientations of electric field and different relative phases. In general, this linear combination yields an elliptically polarized wave; linear polarization (horizontal, vertical, 45°, or another angle) and circular polarization (right circularly polarized, left circularly polarized) are special cases. Stokes parameters $S_0$-$S_3$ can provide a complete description of a polarization state, however other descriptions can be used. Polarization diversity refers to cameras configured to collect light of differing polarization states, or to the images formed from such cameras. Polarization diverse cameras can have significant overlap in the light collected. For example, a camera equipped with a linear polarizer can collect nearly 100% of linearly polarized light having matching electric field orientation, but can also collect about 50% of incident circularly polarized light, which is a linear combination of two crossed and phase-shifted linearly polarized waves. A camera equipped to collect all unpolarized light can also collect 100% of linearly polarized light.

As used herein, "preprocessing" of an image refers to operating on an image acquired by a single camera to render it in a form suitable for further processing or combining with other images. Preprocessing can be performed on a raw image, as initially acquired or stored from a readout of a camera sensor, or on a raw image on which one or more other preprocessing operations have already been performed. (The raw image can be in a raw file format, but this is not a requirement.) Some preprocessing operations, such as intrinsic or extrinsic calibrations, can render the image independent of the specific camera unit or the specific position of the camera within a camera array. Other preprocessing operations, such as bit extension or gamma correction, can be application specific according to needs of downstream processing. Further preprocessing operations, such as denoising, can improve performance of downstream processing. Preprocessed images can be suitable for downstream operations such as registration, fusion, or face detection.

As used herein, "registration" of two or more images refers to application of geometrical transformation to one or more of the images in order to align common features. Some registration features can be fixed edges or corners in the scene, such as edges or corners of lane stripes, while other registration features can be attached to a moving object of interest, such as a corner or edge on a license plate or hood ornament. The latter can allow registration and fusion of images acquired at different times.

As used herein, "saturation" refers to a pixel value in an image that would be unchanged if the light intensity at that pixel were increased. The pixel value of a saturated pixel can misrepresent the associated light intensity. In some examples of the disclosed technology, saturated pixels can be detected and eliminated from further processing, e.g. by application of a saturation pixel mask.

As used herein, a "scene" refers to observable content within a field of view of a camera. The scene does not depend on camera configuration or imaging parameters such as polarization state, spectral filters, or exposure. Thus, dependent on camera configuration or imaging parameters, a variety of images of a same scene can be obtained. Because of camera to camera variations (including spatial positioning), there can be differences in the precise boundaries of images acquired by two cameras. In such cases, a scene can refer to those components or regions of a scene that are common to two or more cameras or to all cameras in a group.

A First Example Imaging Method

FIG. 1 is a flowchart 100 of an example imaging method according to disclosed technologies. In this method, light from a scene can be collected at a plurality of cameras to form respective images. These single-camera images can be registered and then fused. The fused image can be stored or output.

At process block 120, a first array of cameras collects light from a scene in different amounts, i.e. with exposure diversity. At process block 130, the collected light is used to form respective images of the scene for each camera. In like manner, a second array of cameras collects light from the scene with different polarizations, i.e. with polarization diversity, at process block 122. At process block 132, the collected light from the second array is used to form respective images of the scene for each camera.

At process block 150, the images from the first camera array and the images from the second camera array are registered, and at process block 160, the registered images are fused to form a fused image in which scene impairments are mitigated, minimized, or overcome, and detection of scene objects can be performed. Finally, at process block 170, the fused image is output or stored.

Many variations are possible, including without limitation those described herein.

A Second Example Imaging Method

Figure 2:
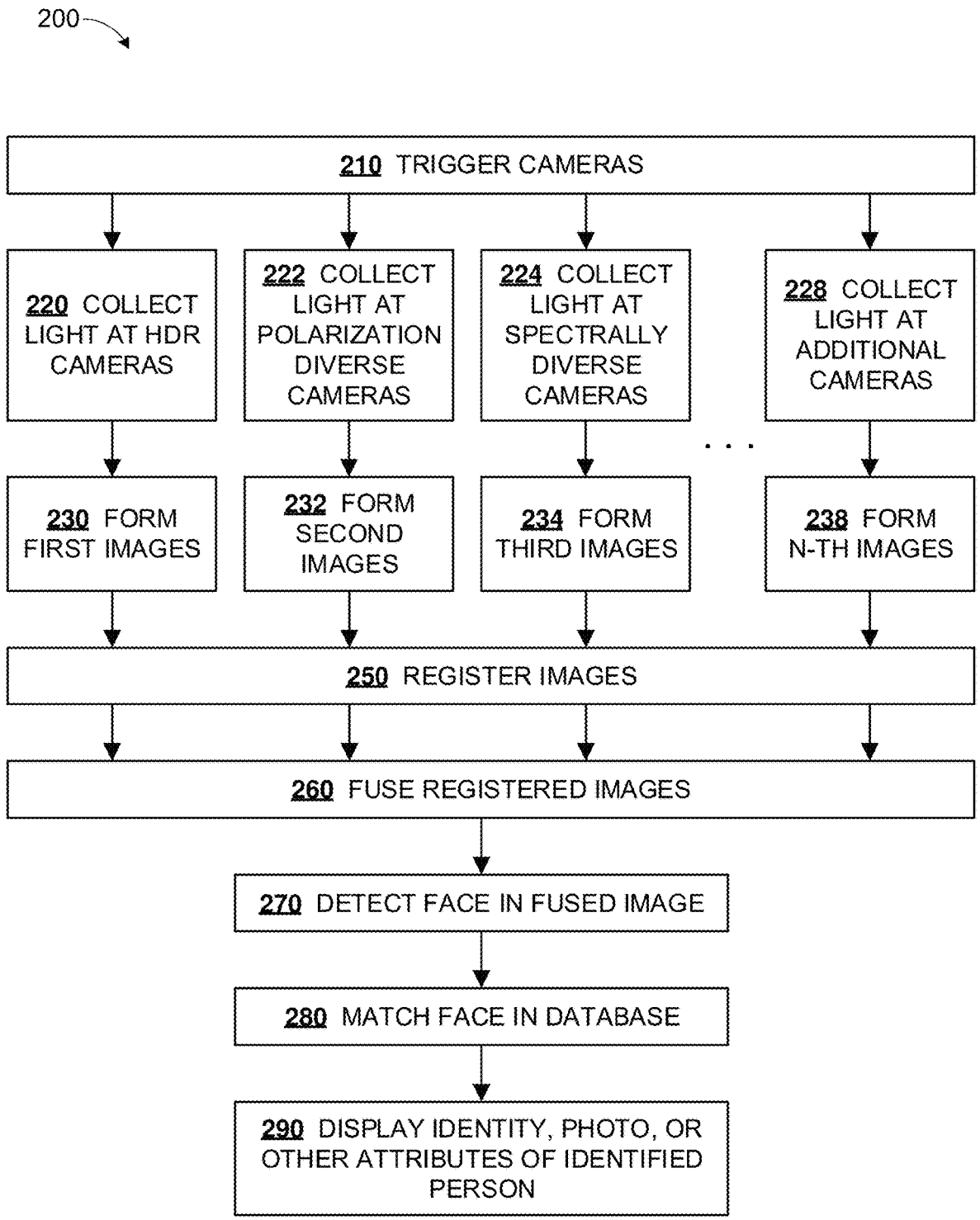
FIG. 2 is a flowchart of another example imaging method according to disclosed technologies.

FIG. 2 is a flowchart 200 of another example imaging method according to disclosed technologies. Camera groups of different diversity types can be triggered to collect light from a scene, and respective images are formed. These images can be registered and fused to form a fused image. A face can be detected in the fused image and matched in a database to a person. Particulars of the person can be displayed.

At process block 210, cameras are triggered by a system controller. In examples, the cameras are triggered synchronously to collect light for imaging a scene at a same instant of time. In examples, the cameras are triggered responsive to a detection of a vehicle or other object of interest having entered the scene or having reached a trip point within the scene.

Responsive to triggering, a first group of exposure diversity ("HDR") cameras collect light at process block 220. Light collection can include camera operations such as opening and closing of a mechanical shutter, enabling and disabling an electronic shutter at the image sensor, autofocusing, and readout of the electronic image sensor. Light collection can also include generation of light (e.g. a "flash") to be collected as reflected from objects in the scene. As an illustration, three HDR cameras can be deployed with (a) ISO 100, 1/400 s shutter speed, (b) ISO 100, 1/100 s, and (c) ISO 400, 1/100 s respectively, with other configuration parameters being equal. As another illustration, three HDR cameras can be deployed with densities 0.3, 0.6, and 0.9. In other examples, more, less, or differently configured HDR cameras can be deployed. At process block 230, respective images are formed for each of the HDR cameras. Image formation can include preprocessing and formatting, including calibration, denoising (especially, edge-preserving denoising), extension of bit depth, as described herein. Image formation can be distributed between the camera and a computer coupled to the camera, to which image data is transferred.

Other groups of diversity cameras can be operated similarly and concurrently. A second group of polarization diversity cameras collects light at process block 222; the collected light is formed into respective images for each polarization diversity camera at process block 232. The actions involved are generally similar to those described for process blocks 220 and 230. As an illustration, three polarization diversity cameras can be deployed, (a) "unpolarized" i.e. configured to collect all incident light regardless of polarization state, (b) vertically polarized light, and (c) linearly polarized at 45° from the vertical. In other examples, more, less, or differently configured polarization diversity cameras can be deployed. Polarization diversity allows separation of desired image features from e.g. windshield glare under diverse conditions of sun position and windshield angle.

A third group of spectral diversity cameras can also be operated similarly and concurrently. These cameras collect light at process block 224; the collected light is formed into respective images for each polarization diversity camera at process block 234. The actions involved are generally similar to those described for process blocks 220 and 230. As an illustration, three spectral diversity cameras can be deployed with (a) a UV+IR filter to block UV and IR and limit collection to visible wavelengths and reduce haze, (b) a narrow bandpass filter at 635 nm or 670 nm (red) that selectively transmits light in a spectral region around 635 or 670 nm, and (c) a narrow bandpass at 850 nm that selectively transmits near infrared (NIR) light in a spectral region around 850 nm. Some UV+IR blocking filters can have passbands from about 450 nm to about 810 nm. Red filters can be effective in reducing blue tinted reflections from the sky. In other examples, more, less, or differently configured spectral diversity cameras can be deployed.

The diversities employed are not limited to exposure, polarization, or spectral diversity. Operation of an additional group of cameras is shown generically at process blocks 228 and 238. These cameras collect light at process block 228; the collected light is formed into respective images for each polarization diversity camera at process block 238. The actions involved are generally similar to those described for process blocks 220 and 230.

Varying embodiments can use any combination of two or more diversity groups of cameras. In some examples where a camera is common between two or more groups, the collection of light and the formation of the image only need to be performed once. In other examples, the collection of light can be done once and at least part of the image formation (i.e. preprocessing) can be done separately for two distinct diversity groups to which the shared camera belongs. In a further example, a camera array incorporating a single group of three cameras can be used. The cameras can have exposure diversity (e.g. an HDR group), with each of the cameras having a matched polarization filter (e.g. linearly polarized at 45° from the vertical) and/or matched spectral filters (e.g. red or infrared pass-band).

Having formed images from all participating cameras, the images are registered at process block 250. In some examples, non-rigid transformations are applied to one or more single-camera images to align features (such as edges) at the same pixel locations (to within a specified tolerance) across all of the single-camera images. In further examples, one of the single-camera images is selected as a reference, and the other single-camera images are transformed to align features to the same position as in the reference image. Registration of the image is done across all diversity groups of cameras, i.e. the different diversity groups are co-registered with one another. The registration tolerance can be specified in pixel units (e.g. plus or minus one pixel, two pixels, and so on), or as a percentage of image size (e.g. within 0.5%, 1%, 2% of the extent of the image) in either the row or column dimension. The registration tolerance can be relative to feature sharpness: that is, the registration tolerance for a sharp edge can be tighter (i.e. smaller variation in position) than the registration tolerance for a diffuse edge. In some examples, registration can be performed in stages, with camera images within a same diversity group registered among themselves first, and then the different diversity groups registered with one another. In such examples, the registration tolerance can be tighter within a single diversity group of cameras, and can be looser (i.e. larger variation in position) between cameras in different diversity groups.

The registered single-camera images (dubbed input images) can be fused at process block 260. As an illustration, each fused image pixel value can be based on the corresponding pixel value in the input image having the greatest activity in a small region around that pixel. Activity level of a pixel or region is a measure of information content, which can be measured based on e.g. pixel contrast, or coefficients of a spatially localized transform such as DCT block coefficients or high-frequency wavelet transform coefficients.

Numerous variations are possible. In some examples, the fused image pixel value is equal to the corresponding pixel value in a selected input image, whereas, in other examples, the fused image pixel value is determined with linear or non-linear scaling to account for the differences in configurations between cameras. For example, in HDR imaging, a 2:1 ratio of pixel values in an input image could represent a 2:1 ratio of light values, i.e. the pixel intensity could be on a linear scale. However, in the fused image, a 2:1 ratio of light could be represented as a compressed 1.4:1 ratio of pixel values, thereby increasing the dynamic range of the available number space. In further examples, the fused image pixel value can be taken as a weighted combination of the corresponding pixel values from multiple input images, with the weights being dependent on local (neighborhood) activity levels in respective input images.

In examples, a saturated pixel mask can be used to guide the registration or fusion so that saturated pixels are disregarded during registration or fusion.

At process block 270, the fused image can be analyzed to detect a face, which can be extracted as a snippet from the fused image. In some examples, a generalized face filter can be convolved with the fused image to produce a likelihood map indicating zero, one, or more positions or regions in the image at which a face is likely to be present. The generalized face filter can be applied with variations for rotations, facial dress (e.g. sunglasses, facial hair, a hat, tattoo, or jewellery), or facial types. Accordingly, multiple face filters can be applied to a single image. The generalized face filter can be a template or can incorporate edge and texture patterns that form a general model of a human face. The generalized face filter can be provided as an input. In further examples, the generalized face filter can be developed by machine learning applied to a corpus of actual face data. Subsequent to convolving, the most likely detected faces can be extracted from the fused image as face snippets, with optional weighting for likely positions of driver and passenger(s). Such an approach is not a requirement, however; other face detection techniques can be used.

The extracted face snippet can be matched in a face database to identify a person matching the detected face, at process block 280. In varying examples, the face database can be remote and accessed over a network, the face database can be locally hosted, or the face database can be remotely hosted and locally mirrored. In varying examples, the matching can be probabilistic, and can return e.g. 80% likelihood of person A, 16% likelihood of person B, and 4% likelihood of person C. Furthermore, the matching can be guided, using inputs such as a license plate number, past occurrences of a particular individual at a particular monitoring site, or active cellular handsets positioned in or near the scene.

Finally, at process block 290, particulars of the matching one or more persons can be displayed. In examples, the displayed information can include one or more of: a name, a photograph, a probability of correct match, an alias, a driver's license number, a date of birth, a mobile phone number, a mobile phone number positioned in or near the scene, whether the person has been identified as a person of interest (e.g. on a watch list, or of possible interest to law enforcement), instructions to on-site personnel, whether the person has been identified as a known person (e.g. on a white list, or recognized as authorized, a known traveler, or likely safe), information on the person's activity, or the person's recently known position.

An Example of Image Collection and Preprocessing

Figure 3:
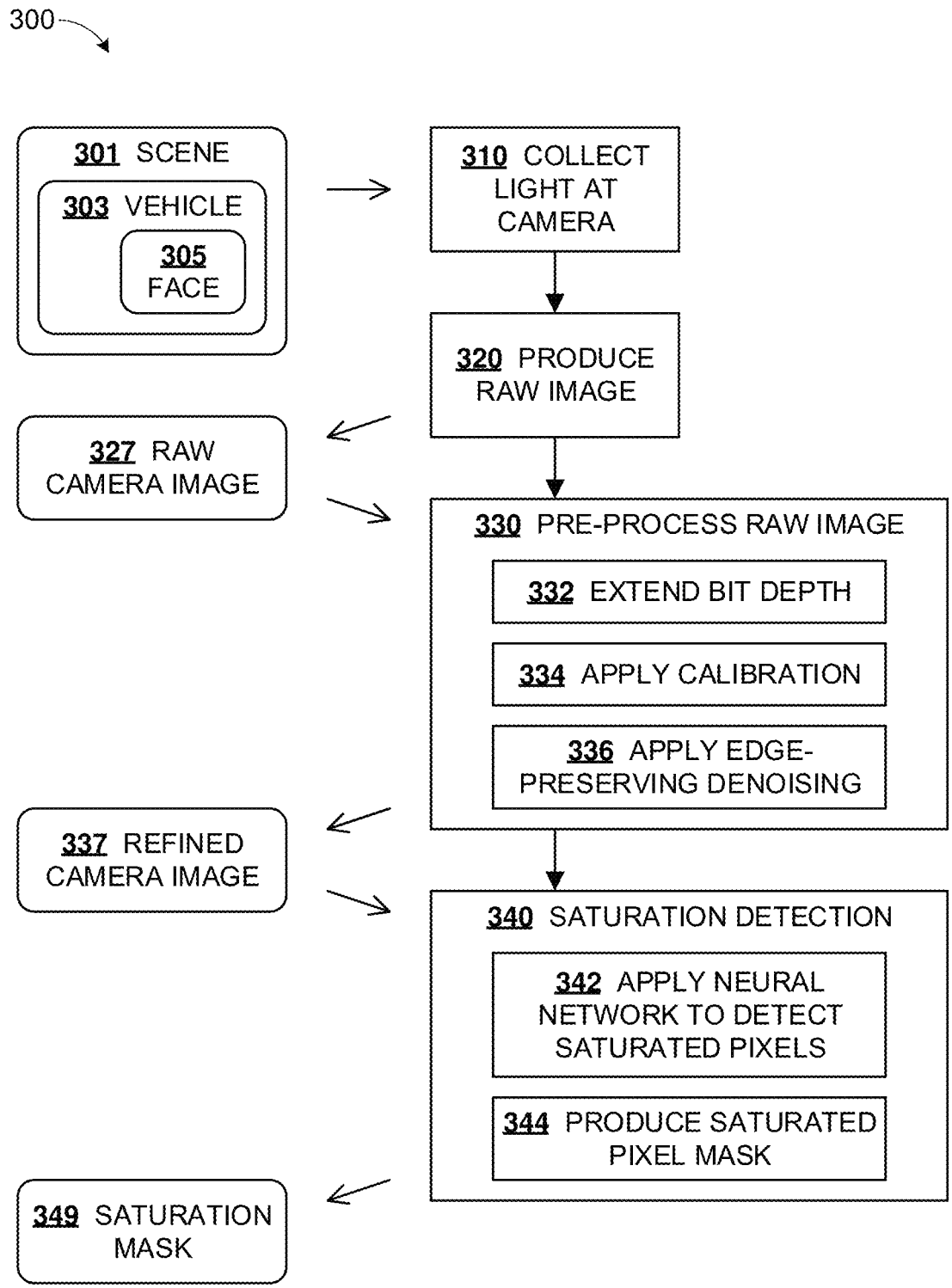
FIG. 3 is a flowchart outlining image collection and preprocessing according to another example of the disclosed technologies.

FIG. 3 is a flowchart 300 outlining image collection and preprocessing according to another example of the disclosed technologies. The flowchart 300 pertains to a single camera, and a similar process can be applied at other cameras of a camera array.

A raw image can be produced from a camera sensor and preprocessed to obtain a refined single-camera image. The refined image can be further processed to detect saturated pixels and produce a saturated pixel mask, which can be used in conjunction with the refined image in further processing.

At process block 310, light from a scene is collected at the camera. Generally, the light can emanate from a scene 301, in which a vehicle 303 containing a face 305 can be present. The collected light can be generated within the scene (e.g. a dome light within the vehicle), can be naturally present (e.g. sunlight), or can be introduced specifically for the purpose of imaging (e.g. active illumination, or a flash). The light can be variously reflected by objects (such as faces or a windshield) within the scene or transmitted at least partially through objects (such as the windshield) within the scene en route to being collected at the camera.

At process block 320, a sensor in the camera is read out electronically to obtain pixel values indicating light intensity measured at respective sensor pixels. These pixel values together constitute a raw camera image 327, which can also include metadata indicating attributes of the camera, its configuration, or the image. In examples, one or more of the cameras in a diversity group can generate monochromatic raw images.

At process block 330, the raw image 327 is preprocessed to obtain a refined camera image 337. Preprocessing 330 can include extension of bit depth 332. In some examples, the bit depth of the raw image 327 can be 8 bits. Extension of the bit depth allows guard bits to be used and preserved during image processing, to avoid loss of numerical precision. Extending bit depth also allows rescaling images (such as input images for HDR) onto a common intensity scale. Finally, extending bit depth allows for expanding the dynamic range, which is the opposite of range compression, so that, as an illustration, a 2:1 ratio of light can be represented as an expanded 4:1 ratio of pixel values. According to the application, an 8-bit raw image depth can be extended to 10, 12, 16, 24, 32, or even more bits.

Preprocessing 330 can also include applying one or more intrinsic or extrinsic calibrations at process block 334. Intrinsic calibrations pertain to attributes or artifacts interior to the camera, and can include, without limitation, applying corrections for lens deformation, distortion, chromatic aberration, or non-uniform sensor sensitivity. Extrinsic calibrations pertain to the relationship between the camera and the scene, and can include, without limitation, applying geometric correction for variations in the orientation and position of the camera relative to an array or group of cameras. For example, a rectangular test pattern positioned perpendicular to an optical axis of a central camera in an array can be imaged as a rectangle in the raw image of the central camera. However, the test pattern could be slightly tilted or offset with respect to the optical axis of another camera, and could be imaged as a trapezoid. Calibrations can be applied 334 in a distributed manner. For example, intrinsic calibrations can be applied on-board the camera, while extrinsic calibrations can be applied at a computer coupled to the camera. In other examples, intrinsic and extrinsic calibrations can both be applied at the computer.

The raw image 327 can also include noise, which can be caused by refraction, scattering, or other transmission effects between the scene and the camera. Noise can also be caused by stray light in the camera optics, or electronic noise at the camera sensor or readout electronics. Therefore, preprocessing 330 can also include denoising 336. It can be advantageous to apply an edge-preserving denoising technique to improve subsequent performance of registration and face detection. While some denoising filters can remove high-frequency noise, an edge-preserving denoising filter can preserve some high-frequency components of a signal (e.g. across an edge) in a case where the high-frequency component is correlated in a direction (e.g. along the edge) that is transverse to the high-frequency component.

In varying examples, any combination of the above preprocessing operations 332, 334, 336 can be implemented. Furthermore, the ordering of the preprocessing operations can be in the order shown in FIG. 3 or can be varied.

Preprocessing 330 results in formation of a refined camera image 337, which can be stored by a computer. The refined camera image 337 can be used for saturation detection at process block 340. The presence of saturated pixels in a single-camera image can adversely impact registration, because a feature to be used for registration could be indiscernible or incompletely discernible due to saturation. Further, edges could erroneously be detected at the boundary of the saturated region. Saturated pixels can also skew the results of image fusion. Therefore, it is desirable to identify saturation in single-camera images so that saturated regions of an image can be omitted from downstream processing.

At process block 342, saturated pixels can be detected. In some examples, a trained deep neural network (dubbed "DNN") can be used to detect saturated pixels in the refined image 337. The DNN can be trained with a set of training images prior to acquisition of images at process blocks 310, 320. Then, at process block 342, the refined image 337 can be provided as input to the DNN, resulting in identification of pixels likely to be saturated. Alternatively, other machine learning classifiers can be used, such as a support vector machine, vector quantization, a decision tree, or a forest. At process block 344, a map 349 is produced, indicating the locations of these likely saturated pixels, and dubbed "saturated pixel mask" or "saturation mask."

An Example Fusion Method

Figure 4:
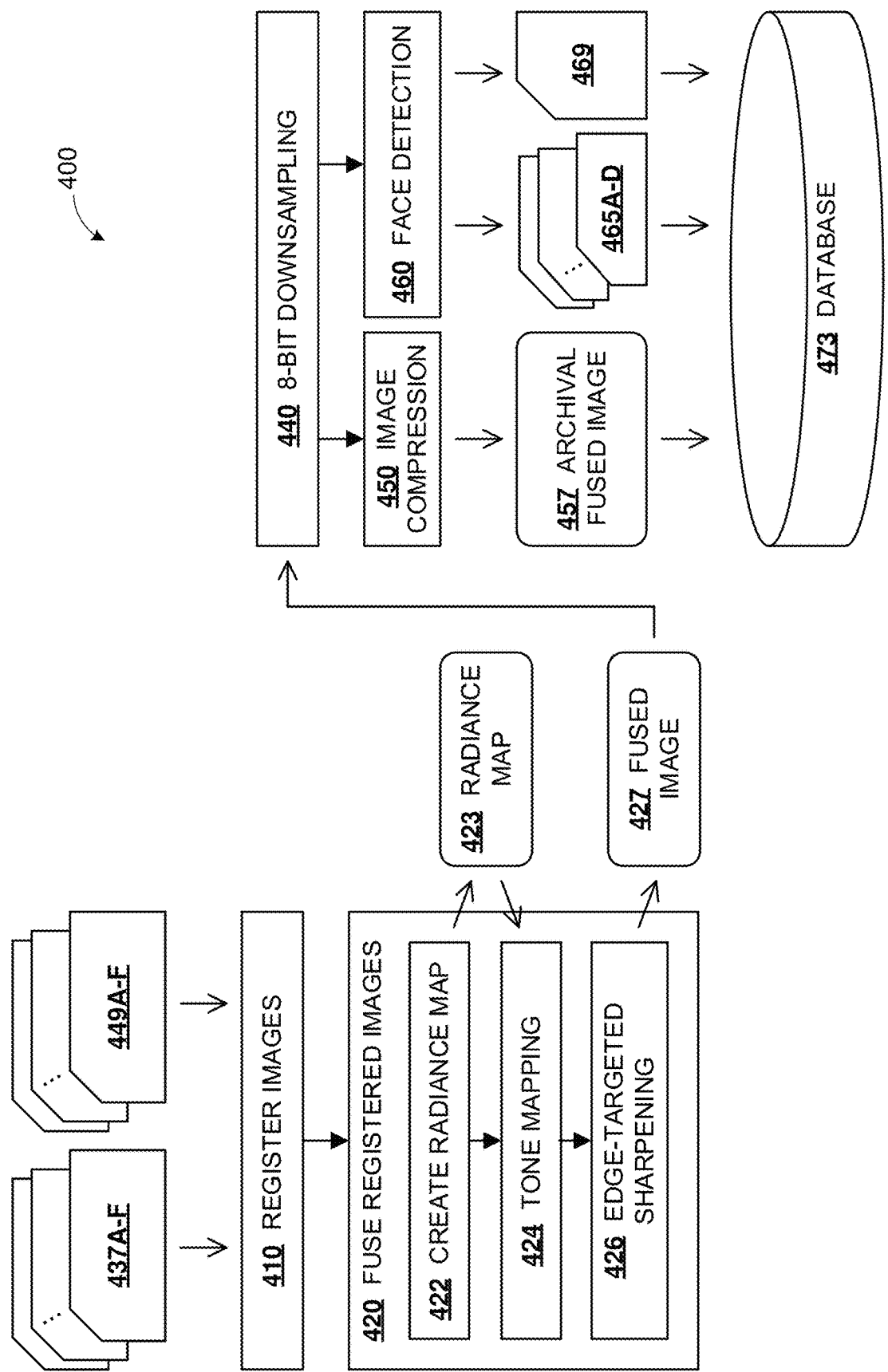
FIG. 4 is a flowchart of an example method for fusion in a face detection application, according to disclosed technologies.

FIG. 4 is a flowchart 400 of an example method for fusion in a face detection application. Single-camera images 437A-437F and respective saturation pixel masks 449A-449F can be registered at block 410 and fused at process block 420. Fusion can include, at process block 422, computation of a radiance map 423 that indicates light intensity of a fused image at every pixel position. At process block 424, tone mapping can be performed to represent these radiance values within a numerical pixel range according to a tone mapping scale. Then, at process block 426, an edge targeted sharpening filter can be applied to improve the delineation of features in the fused image 427.

In some examples, image fusion can be handled as a linear estimation problem. Because the various single-camera images 437A-437F can represent a common scene containing common objects or features, the variations in single-camera images 437A-437F can be due to predetermined variations in optical configuration of the respective cameras. Thus, each image 437A-437F can be modeled as a known transformation applied to an unknown scene, leading to a system of equations. A best fit solution (or, one having minimum residual variance) for the unknown scene can be used as the fused image. In further examples, the transformations or equations can be linear. However, such an approach is not a requirement, and other image fusion techniques can be used.

Turning to the face detection application, at process block 440, the fused image can be down-sampled to a depth of 8 bits. At process block 450, the down-sampled image can be compressed according to JPEG, PNG or another compression scheme to obtain an archival fused image 457 which can be stored in database 473. For a lossy compression scheme, a target quality level can be preset, such as at least 90% quality. At process block 460, the down-sampled image is input to a face detector, which can detect one or more high-resolution faces 465A-465D in the fused image, if present, together with their respective locations in the down-sampled image, which can be produced as a list 469. The high-resolution face snippets 465A-465D and associated locations 469 can also be stored to database 473.

An Example Inspection System

Figure 5:
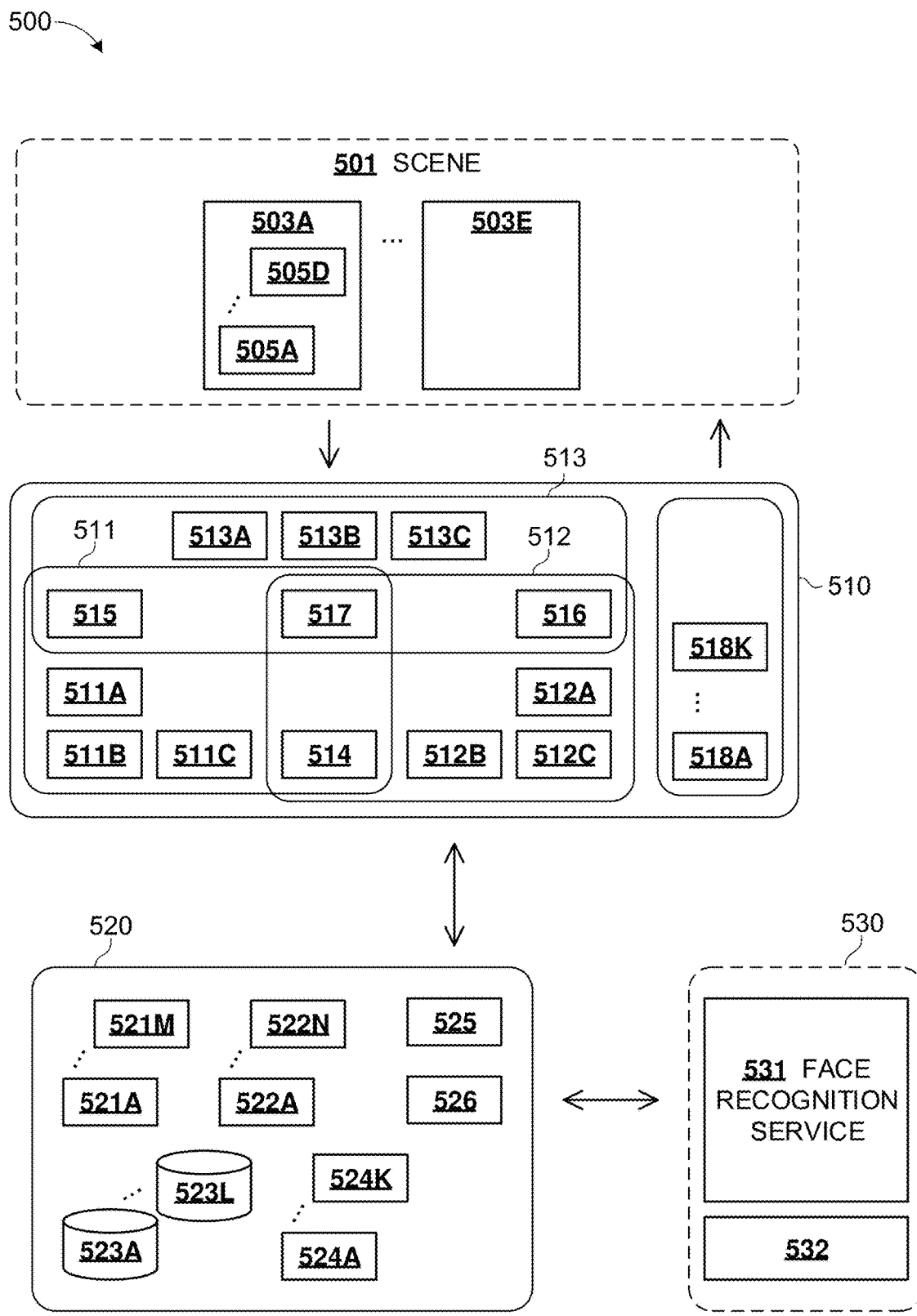
FIG. 5 is a block diagram of an example imaging system according to disclosed technologies.

FIG. 5 is a block diagram 500 of an example inspection system according to disclosed technologies. Camera and lighting system 510 can be optically coupled to a scene 501 and communicatively coupled to a computing system 520, which in turn can be communicatively coupled to one or more database services 530. While common embodiments of a disclosed inspection system include the camera and lighting system 510 and the computing system 520, varying embodiments of the system can include none, part, or all of scene 501 and database services 530, which are shown at least for illustrative purposes.

Scene 501 can include one or more objects 503A-503E. Exemplary object 503A can include one or more features of interest 505A-505D. In some examples, the objects 503 can include vehicles or people, and features of interest 505 can include faces. In other examples, objects 503 can be objects in a manufacturing process, such as a process chamber (e.g. for a wet process or 3-D printing), a carrier for an item of manufacture, or the item of manufacture itself. In such examples, features of interest 505 can include items of manufacture or visible features of these items. Scene 501 can also include registration marks, for example lane markings, poles, signage, or other structures or markings, to facilitate registration of single-camera images such as at process blocks 150 or 250. Similarly, the objects 503 can also features useful for registration, such as a license plate, a headlight, an edge or fiducial marking on a process chamber, a manufacturing carrier, or an item of manufacture.

The camera and lighting system 510 is depicted with three diversity groups of cameras 511, 512, 513, although other examples could have fewer or more diversity groups. Diversity group 511 is shown having three dedicated cameras 511A-511C, and also sharing cameras 514, 515, 517 with other diversity groups. Similarly, diversity group 512 has dedicated cameras 512A-512C, but also includes shared cameras 514, 516, 517. Diversity group 513 has dedicated cameras 513A-513C, along with shared cameras 515, 516, 517. The shared cameras are optional, independently of one another. A diversity group can be a group of two or more cameras differing in one or more attribute. While common diversity groups differ in exactly one optical parameter, along with a small variation in position and possibly orientation, this is not a requirement. A diversity group can be independent from other diversity groups, or two or more diversity groups can share one or more cameras as shown in FIG. 5.

In some examples, each camera group has at least three cameras. In further examples, the cameras of camera and lighting system 510 can be arranged on a hexagonal grid (e.g. with a central camera having six nearest neighbors arranged on vertices of a hexagon) for tight packing, so as to minimize differences among the cameras' respective lines of sight. An illustration of a camera system similar to 510, having an array of seven cameras, is described below with reference to FIG. 8.

Camera and lighting system 510 is also shown including optional active lighting units 518A-518K, which can be spatially positioned in or around the scene and the cameras. Any one or more lighting units 518 can be actively controlled, i.e. similar to a flash, while other lighting units 518 can be steadily ON, i.e. similar to background fill lighting, in any combination. Besides differing in spatial location, lighting units 518 can also have varying spectral characteristics, varying diffusers, and varying timing patterns. Light from lighting units 518 illuminates all or portions of the scene 501, as indicated by arrow 551, while light from the scene 501 is received by camera groups 511-513 as indicated by arrow 552. One or more of lighting units 518A-518K can be infrared. Infrared illumination can be advantageous to avoid distracting a vehicle driver, and also because infrared light can have better transmission through windshield glass. In some examples, no active lighting is used, and camera and lighting system 510 is simply a camera system 510.

Computing system 520 is coupled to control camera and lighting system 510 and also to receive image data therefrom, as indicated by arrow 553. Computing system 520 can include multiple hardware processors 521A-521M, coupled memory 522A-522M, coupled storage units 523A-523L, optional displays 524A-524K, interfaces 525 for connection to the camera and lighting system 510 and 526 for network connection to e.g. database services 530. Although not shown in FIG. 5, various components of computing system 520 can be communicatively coupled together. Each interface shown can be implemented as one or more distinct interfaces. Alternatively, interfaces 525 and 526 can be implemented as a single interface. Other details of computing system 520 are described herein.

Hardware processors 521 can execute computer-readable instructions from memory 522 or storage 523, to process image data received over interface 525 from camera system 510 as described herein. Hardware processors 521 can also execute computer-readable instructions to control lighting units 518 via interface 525. Storage units 523 can store executable instructions, configuration settings, single-camera images, fused images, and other associated files, including files representing data structures. Displays 524 can serve as an operator console, and can display any combination of raw images, preprocessed single-camera images, fused images, license plate numbers, detected faces, or particulars of identified individuals.

Database services 530 can include a face recognition service 531 or other optional databases or services 532. Databases or services 532 can include law enforcement records, other government records, corporate personnel databases, vehicle registration databases, mobile phone databases, or factory logs. Although in common examples, face recognition service 531 is used to provide information to the computing system 520, in other examples, one or more databases 532 can be updated by the computing system 520. A service can be provided by a server, which can be communicatively coupled to a database or other resource.

An Example Camera

Figure 6:
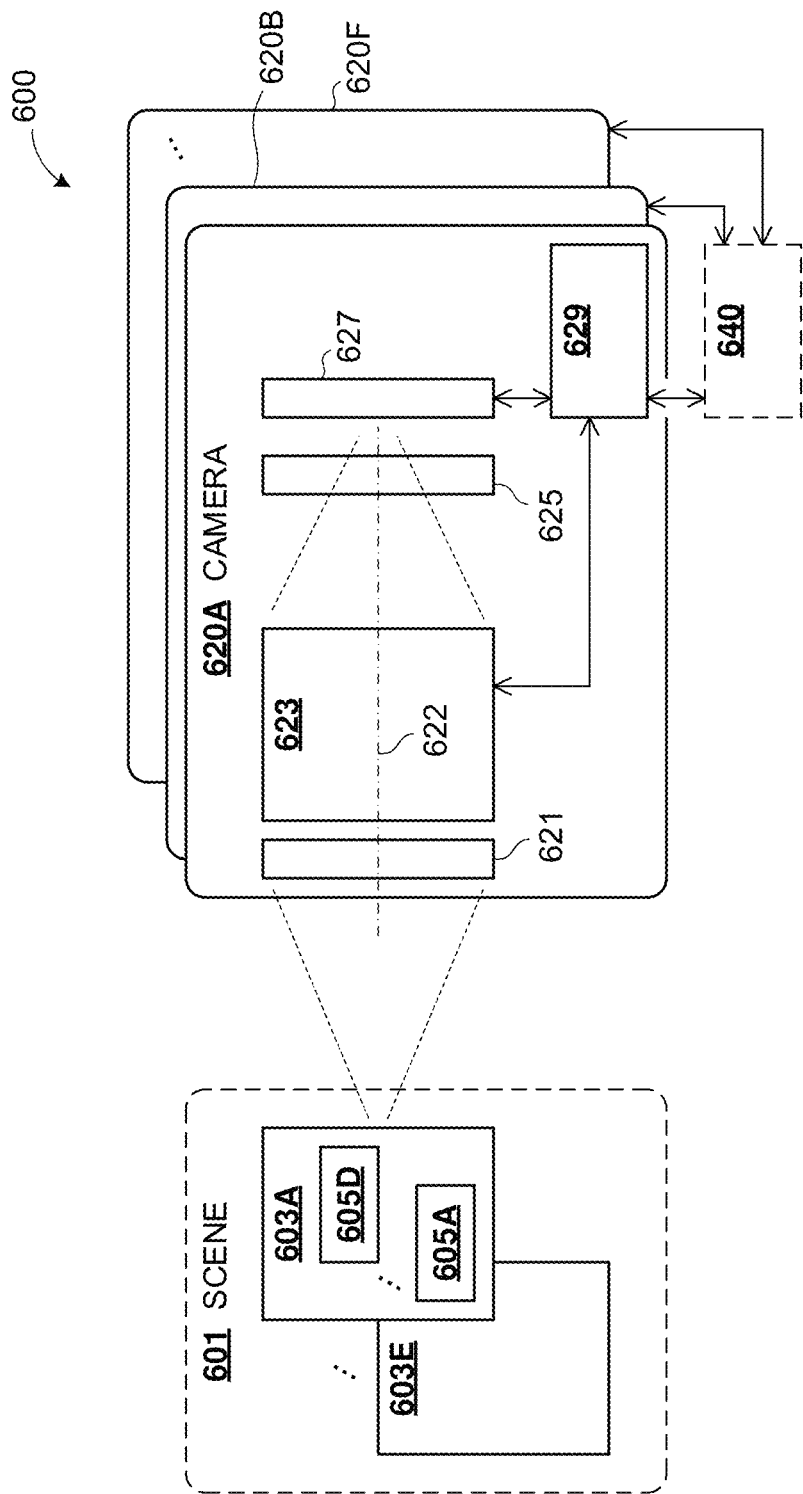
FIG. 6 is a block diagram of an example camera of a camera array suitable for use with the disclosed technologies.

FIG. 6 is a block diagram 600 of an example camera 620A of a camera array 620A-620F suitable for use with the disclosed technologies. Camera 620A can observe a scene 601 and can be coupled to one or more of an external controller, computer system, or storage unit represented generically as box 640.

Scene 601 can contain one or more objects 603A-603E each having one or more features of interest such as 605A-605D, as described herein. Light from scene 601 can be incident on camera 620, comprising a lens assembly 623, an image sensor 627, and an internal controller 629. Lens assembly 623 can focus or collimate the incident light and deliver focused or nearly focused light to the plane of image sensor 627.

The camera 620 can include additional optical components in the optical path between scene 601 and sensor 627, which can commonly be mounted front-side, as shown by component 621, or between the lens assembly 623 and sensor 627, as shown by component 625. Filters can commonly be mounted in front-side position 621, and can include one or more of a neutral density filter, a UV blocking filter, an IR blocking filter, a color-selective filter, a color blocking filter, a monochromatic filter, a narrow bandpass filter, or an IR passing filter. Polarizers can also commonly be mounted in front-side position 621, and can be based on e.g. a wire grid, elongated metallic nanoparticles, a birefringent material, a dichroic material, thin film, or multi-layer stack. Polarizers can be of absorptive or beam-splitting types. Some cameras 620 may include an integrated UV+IR blocking filter in an interior position 625. A plenoptic microlens array can be integrated at position 625 proximate the plane of sensor 627 to distribute light at each microlens position among a neighborhood of associated pixel positions, for post-acquisition re-focusing.

The controller 629 can control and monitor the lens assembly 623, to perform functions such as focusing, image stabilization, or shutter control. The controller 629 can also provide drive signals to control image sensor 627 and can cause the image sensor 627 to be read out. Readout electronics can be distributed at and between the image sensor 627 and the controller 629.

Camera 620 can also contain additional components not shown in FIG. 6, such as a housing, a power supply, a shutter (which can also be controlled by controller 629), a monitor or viewfinder, and various mechanical fittings. In varying examples, the disclosed technologies can be implemented with commercial off-the-shelf cameras, modified commercially available cameras, or custom purpose-built camera designs, in any combination. Cameras 620B-620F can be similar to camera 620A, but can have different components.

A Second Example Camera

Figure 7:
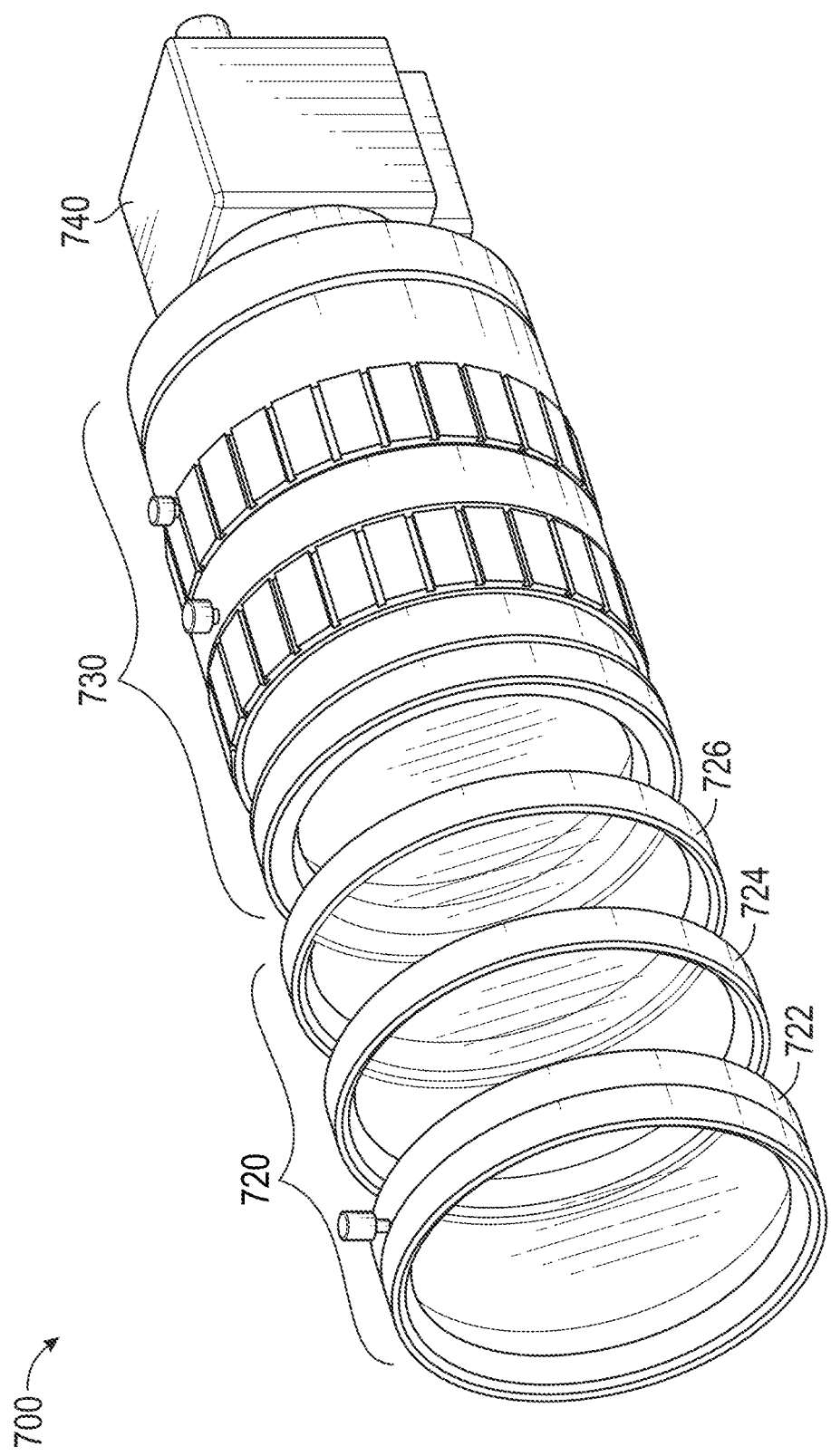
FIG. 7 is an exploded view of a second example camera suitable for use with the disclosed technologies.

FIG. 7 is an exploded view of a second example camera 700 suitable for use with the disclosed technologies. Camera 700 incorporates a 35 mm lens 730 coupled to a sensor 740, and has several front mounted optical filter components 720. Linear polarization filter 722 can control the polarization state of light collected by camera 700. Neutral density filter 724 can control the exposure of light collected by camera 700. UV-IR blocking filter 726 can reduce haze in images formed by camera 700. Camera 700 can be part of an array of cameras as disclosed herein. In varying examples, one or more of optical filters 720 can be omitted or repositioned. In further examples, additional components can be introduced. Camera 700 can view a scene similar to 601 and can be operatively controlled by or read out to a controller similar to 629 or 640.

An Example of Imaging by a Camera Array

Figure 8:
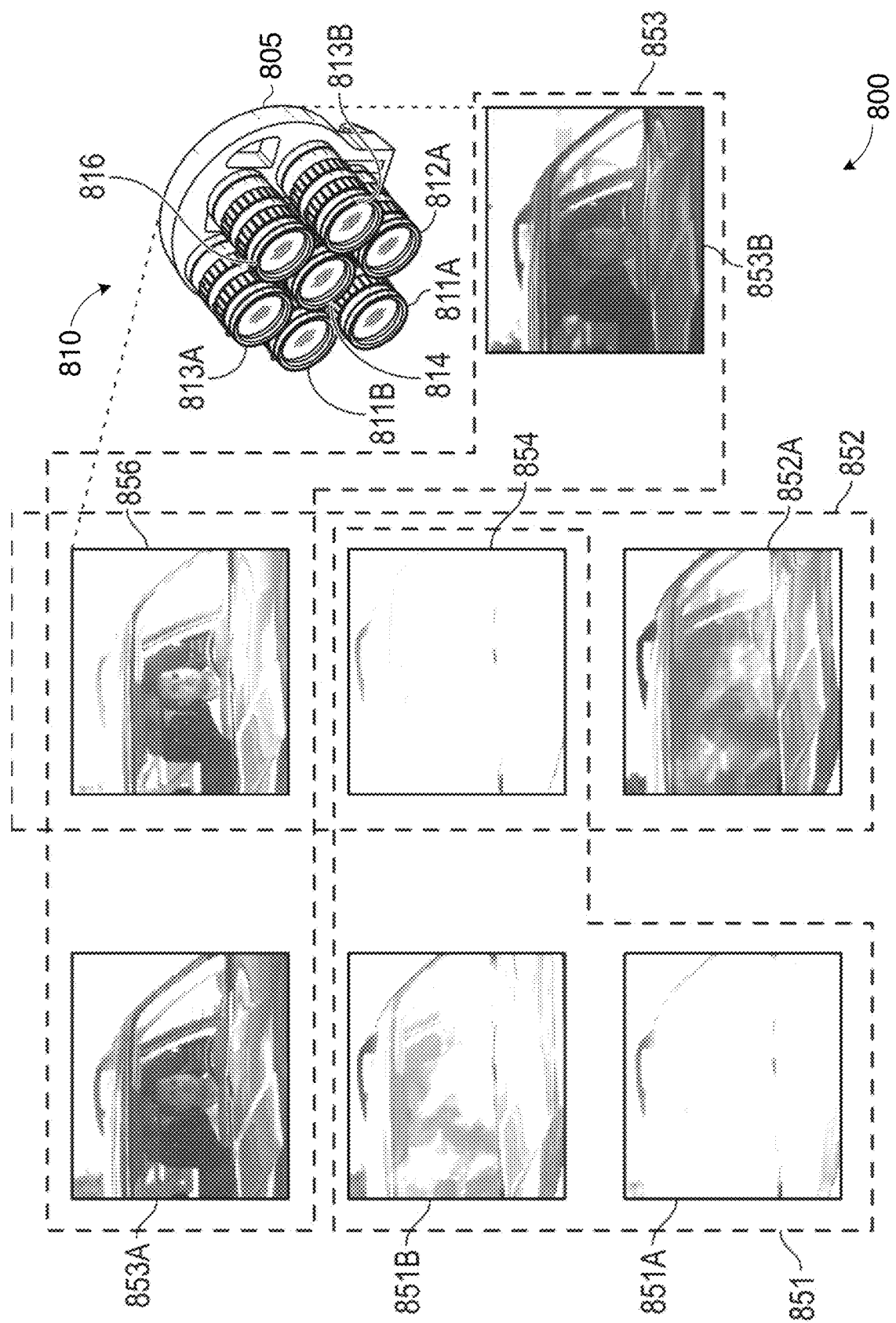
FIG. 8 illustrates an example of imaging by a camera array according to the disclosed technology.

FIG. 8 is an illustration 800 an example of imaging by a camera array 810 incorporating seven cameras, all of which are monochromatic cameras with a UV+IR blocking filter. In the example illustrated in FIG. 8, the cameras of array 810 are supported on a mount 805. A central camera 814 can have a 100% (i.e. clear) neutral density filter, with six other cameras arranged in a ring about the central camera. Two of these cameras 811A, 811B are similar to the central camera 814, however with 50% and 25% transmissive neutral density filters: together these three cameras 814, 811A, 811B can provide a first HDR camera group similar to 511. Also illustrated are corresponding images 851 (854, 851A, 851B) formed from light collected by this camera group while viewing a common scene. Two other cameras 812A, 816 can be configured with 45° and 90° linear polarizers respectively. Cameras 814, 812A, 816 constitute a second camera group similar to 512 having polarization diversity. Corresponding images 852 (854, 852A, 856) formed by this camera group are illustrated. Finally, two further cameras 813A, 813B have 90° linear polarizers with 50% and 25% transmissive neutral density filters respectively. Thus, a third camera group similar to 513, comprising cameras 816, 813A, 813B has exposure diversity with 90° linear polarization. The corresponding images 853 are 856, 853A, 853B. In this illustration 800, two HDR camera groups providing exposure diversity are provided, together with one polarization diversity group. In other examples, cameras 813A, 813B could be configured to provide spectral diversity or another form of diversity, optionally in conjunction with camera 814 or camera 816. In further examples, more or fewer cameras can be incorporated into a camera array similar to array 810.

An Example of Face Recognition

Figure 9:
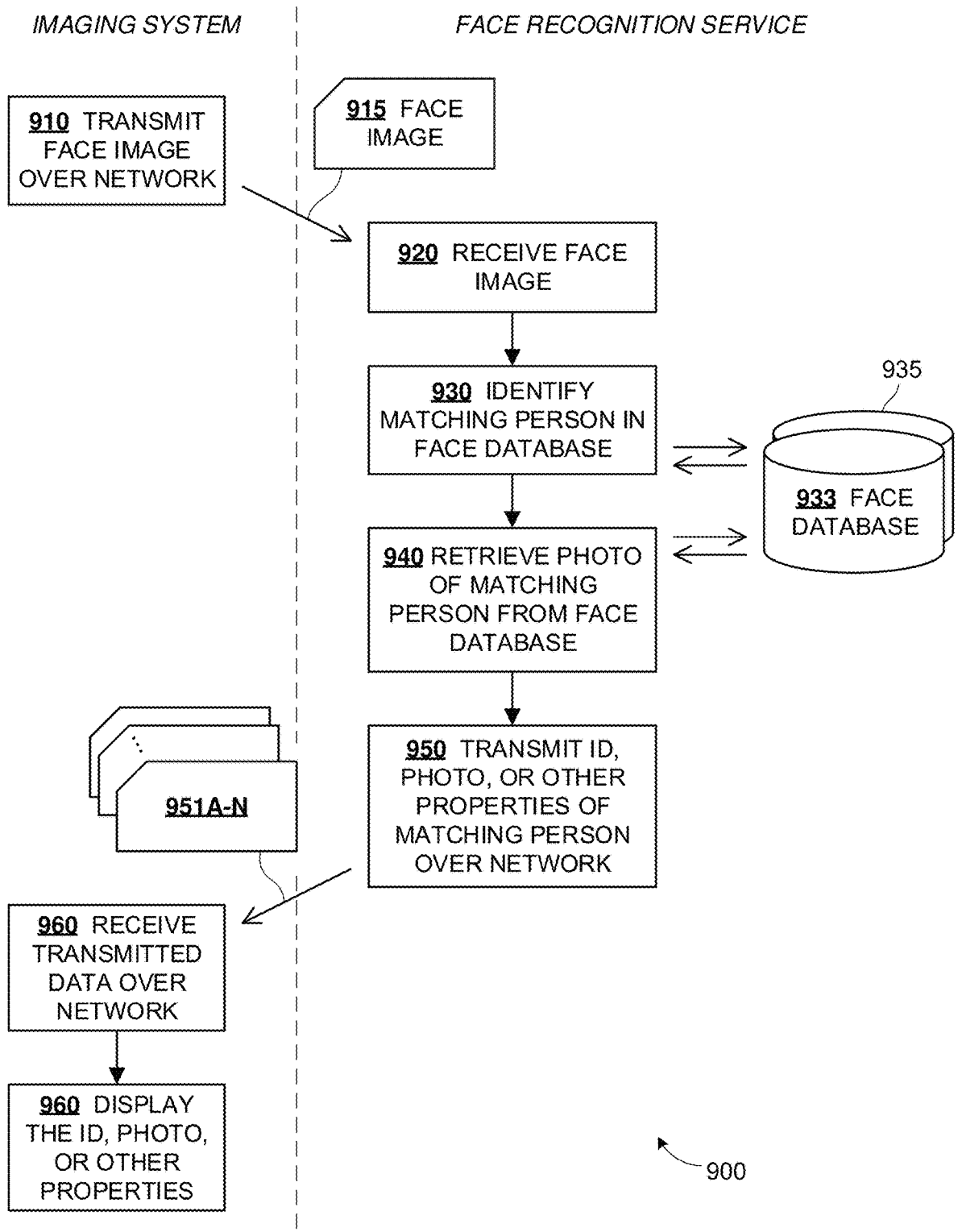
FIG. 9 is a flowchart outlining integration of face recognition into the disclosed technologies.

FIG. 9 is a flowchart 900 outlining integration of face recognition into the disclosed technologies. In flowchart 9, an imaging system—such as a computing system 520 of FIG. 5 coupled to a camera system 510—interacts with a face recognition service similar to service 521. Actions performed at the imaging system are shown on the left side of flowchart 900, while actions performed at the face recognition service are shown on the right side of flowchart 900.

At process block 910, the imaging system can transmit a detected face image 915 over a network to the face recognition service. The face recognition service can receive the transmitted face image 915 at process block 920, and can attempt to match the face image 915 in face database 933.

Assuming a match can be found, a photograph or other attributes of the matching person can be retrieved at process block 940. In some examples, the photograph can be retrieved from the same database 933 used for match determination, while in other examples, the face database 933 can contain data structures storing numerical parameters encoding facial features, and the actual digital photographs can be stored in a separate database 935. Likewise, other attributes—such as name, driver's license information, or law enforcement status—can be stored integrally in the face database 933 or in one or more separate databases 935.

At process block 950, data records 951A-951N describing the matching person are transmitted back to the requesting imaging system. As described herein, this information can include the matching person's name, photograph, or other identifying or status information regarding the matching person.

At process block 960, the data records 951A-951N can be received by the imaging system. Finally, at process block 970, one or more of the data records 951A-951N can be displayed on a monitor such as 524A. The display can be coded appropriately according to a classification of the identified person. In examples, a visual or audio annunciator can indicate a special circumstance, such as a missing, blacklisted, or unauthorized individual.

For purpose of illustration, FIG. 9 is drawn for the case where a single correct match to the face image 915 is found. However, this may not always be the case. In some instances a match may not be found, which can be reported back to the imaging system in e.g. a not-found message. In other instances, multiple matches can be found, and information of all or leading matching persons can be returned.

In further examples, the face recognition can be guided by metadata. Some metadata can be transmitted alongside the face image 915 at process block 910, such as a license plate of vehicle in which the face was located, or phone numbers of active mobile devices whose location can be triangulated to match the location of the vehicle. Other metadata can be available at the face recognition service, such as previous matches at the requesting imaging system or at a nearby imaging system. For example, a face at a highway tollbooth is likely to match a person previously identified at a preceding tollbooth along the direction of travel. For guided recognition, the face recognition service can use additional databases 935, such as cellphone or vehicle registration records.

An Example Deployment

Figure 10:
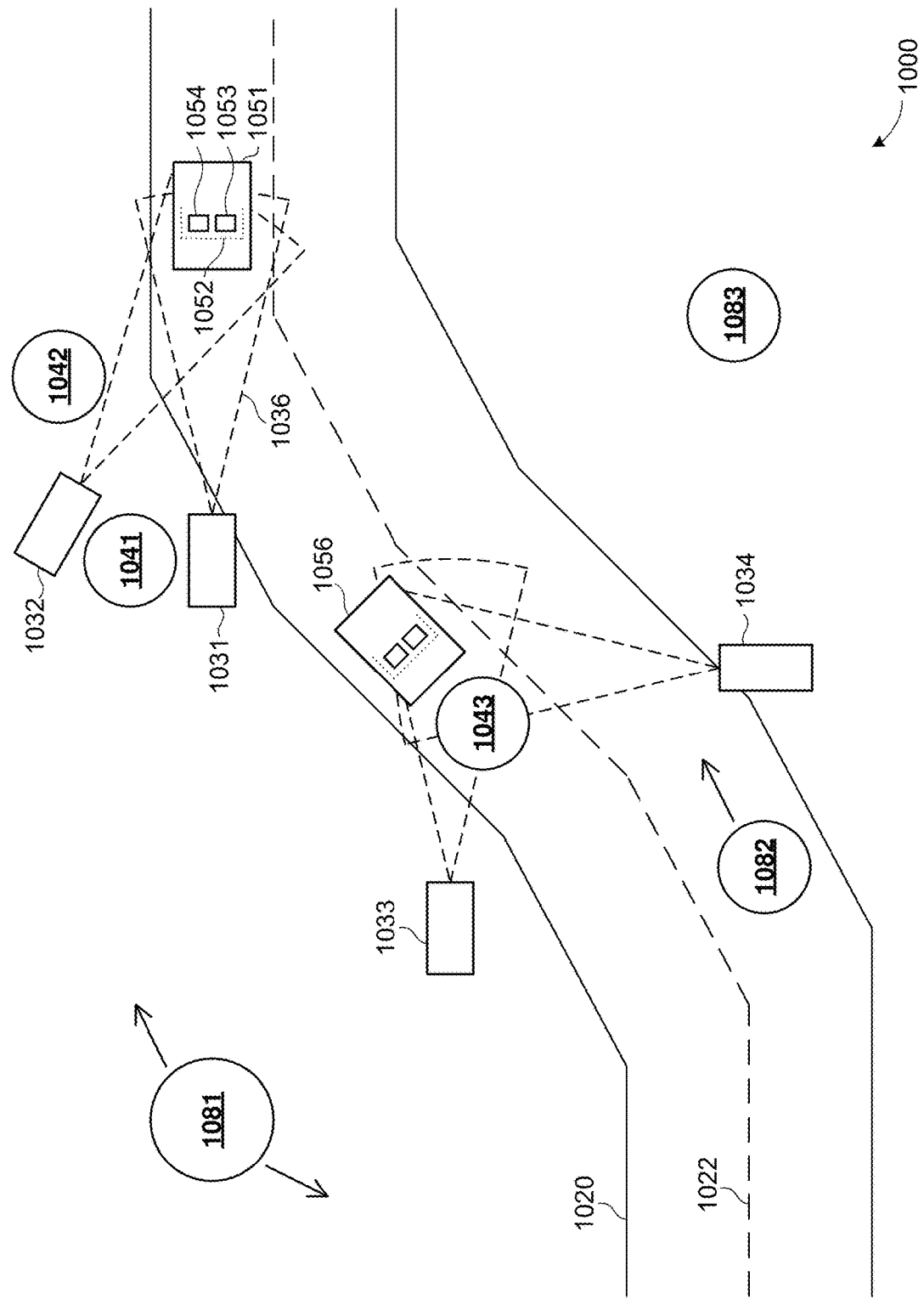
FIG. 10 is an illustration of an example deployment of disclosed technologies in a vehicle scanning application.

FIG. 10 is a diagram 1000 of an example deployment of disclosed technologies in a vehicle scanning application. In this deployment, a vehicle 1051, 1056 can be imaged by camera systems 1031-1034 as it travels on a roadway 1020.

Roadway 1020 is shown having bends and lane stripes 1022. The bends can be engineered to provide different viewing angles relative to sunlight or other background lighting. Lane stripes 1022 can guide traffic flow, and can also provide marks for image registration.

On roadway 1020, vehicle 1051 is shown traveling from right to left. The vehicle 1051 can have features of interest 1053, 1054, which can be faces of a driver and a passenger. A windshield and front door windows 1052 are shown as dotted line.

Camera arrays 1031 and 1032 are positioned to view the vehicle 1051 as it travels the roadway 1020. The camera arrays 1031, 1032 can implement the disclosed technologies described herein. The cameras in camera array 1031 have a common field of view 1036, although there could be small or modest variations between the precise field of view boundaries of individual cameras. The other camera arrays 1032-1034 have similar fields of view, according to their positioning and orientation. Each camera of camera array 1031 can view a scene in the field of view 1036 and take an image of this scene showing the vehicle 1051 along with faces of occupants 1053, 1054. Faces of occupants 1053, 1054 can be imaged through window glass 1052. In some examples, camera arrays are arranged to have a common focus point about 10 to 20 feet away from the cameras.

Viewing conditions can vary as the sun 1081 moves through the sky. Viewing conditions can also be impacted by other moving or stationary ambient light sources 1082, such as headlights or other lights of another vehicle, or nearby buildings, signage, or outdoor lighting, represented as a circle 1083.

Thus, at certain times of day or under certain conditions, camera array 1031 can have a clear view of occupants 1053, 1054. At other times of day, the view of camera array 1031 can be impaired by sunlight reflecting off windshield 1052 or the headlights of vehicle 1051 itself. At such times, camera array 1032 mounted obliquely can have a clearer view than camera array 1031. To assist with imaging, active lighting systems 1041, 1042 can be provided at different locations, each comprising one or more steady or timed lighting units similar to 518A-518K described herein.

As an alternative to having camera arrays 1031, 1032 in different orientations, it can also be advantageous to have different orientations of vehicle 1051, 1056, which can be accomplished by bends in the road 1020 as shown. Thus, the orientation of vehicle 1056 can provide clear images compared with vehicle 1051. Vehicle 1051 is in view of camera arrays 1033, 1034. As a variant on the forward and side positioning of lighting systems 1041, 1042, vehicle 1056 can be illuminated by overhead lighting 1043, which can be mounted on a frame above the roadway 1020.

Each vehicle 1051, 1056 passing along roadway 1020 can be imaged at same or different times by multiple camera arrays. In some examples, images from spatially separated camera arrays 1031, 1032 can be processed separately, i.e. images from camera array 1031 can be registered and fused as one set of images to produce one fused image, while images from camera array 1032 can be registered and fused as a second set of images to produce a second fused image. In other examples, where camera arrays 1031, 1032 have overlapping fields of view with common registration features, then images from both camera arrays can be registered and fused together to form a single fused image.

In further examples, camera arrays 1031-1034 can be used to produce four respective fused images, but the detected faces from each fused image can be extracted and fused further to obtain a single face image (e.g. 915) at a subsequent processing stage, prior to matching the face against a face database (e.g. 280 or 933). In this way, a best quality face image 915 can be obtained over the time that vehicle 1051 traverses the roadway 1020.

Further Example Features

1. Temporal Diversity

In some embodiments, images can be compared or combined with reference to timing of active illumination. As a first example, a first image can be acquired while an active illumination (flash) is off, and a second image can be acquired with active illumination on. The two images can be collected on a same camera or on different cameras. Subtraction of the first image (background) from the second image can beneficially reduce or eliminate unwanted glare or reflections from environmental illumination.

As another example, two or more active illumination sources can be pulsed in distinct coded sequences, synchronized with frame acquisition rates of one or more cameras. Through correlation of image frames with the coded sequences, images for respective illumination sources can be separated out.

2. Focus Diversity

Plenoptic imaging, with a microlens array in front of a camera sensor, allows post-acquisition focusing to be applied to an image so as to obtain near-field, mid-field, and far-field focusing from a single image acquisition. This can be advantageous to preserve depth of field in low-light situations where it can be desirable to have a camera with wide aperture placed proximate to a target object location. Alternatively, a group of cameras can be used to obtain focus diversity.

A Generalized Computer Environment

Figure 11:
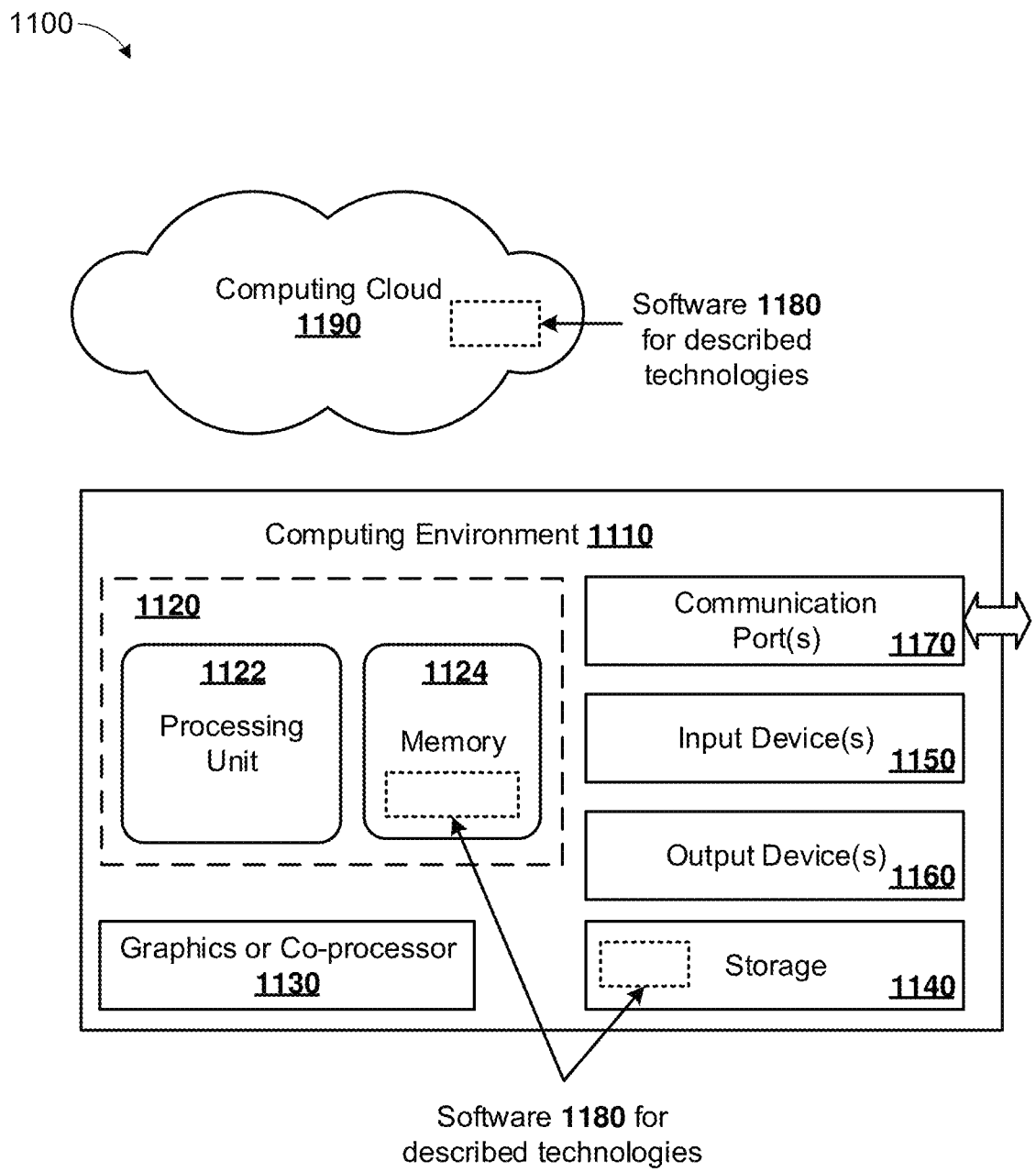
FIG. 11 illustrates a generalized example of a suitable computing environment in which described embodiments, techniques, and technologies pertaining to a disclosed file index can be implemented.

FIG. 11 illustrates a generalized example of a suitable computing system 1100 in which described examples, techniques, and technologies for high quality imaging in impaired environments can be implemented. The computing system 1100 is not intended to suggest any limitation as to scope of use or functionality of the present disclosure, as the innovations can be implemented in diverse general-purpose or special-purpose computing systems. The computing system 1100 can control a disclosed inspection system; acquire, process, output or store image data, including fused images, face image snippets, and saturated pixel masks.

With reference to FIG. 11, computing environment 1110 includes one or more processing units 1122 and memory 1124. In FIG. 11, this basic configuration 1120 is included within a dashed line. Processing unit 1122 can execute computer-executable instructions, such as for high quality imaging as described herein. Processing unit 1122 can be a general-purpose central processing unit (CPU), a processor in an application-specific integrated circuit (ASIC), or any other type of processor. In a multi-processing system, multiple processing units execute computer-executable instructions to increase processing power. Computing environment 1110 can also include a graphics processing unit or co-processing unit 1130. Tangible memory 1124 can be volatile memory (e.g., registers, cache, or RAM), non-volatile memory (e.g., ROM, EEPROM, or flash memory), or some combination thereof, accessible by processing units 1122, 1130. The memory 1124 stores software 1180 implementing one or more innovations described herein, in the form of computer-executable instructions suitable for execution by the processing unit(s) 1122, 1130. The memory 1124 can also store images of scenes or objects and features therein, or database data. The memory 1124 can also store configuration and operational data.

A computing system 1110 can have additional features, such as one or more of storage 1140, input devices 1150, output devices 1160, or communication ports 1170. An interconnection mechanism (not shown) such as a bus, controller, or network interconnects the components of the computing environment 1110. Typically, operating system software (not shown) provides an operating environment for other software executing in the computing environment 1110, and coordinates activities of the components of the computing environment 1110.

The tangible storage 1140 can be removable or non-removable, and includes magnetic disks, magnetic tapes or cassettes, CD-ROMs, DVDs, or any other medium which can be used to store information in a non-transitory way and which can be accessed within the computing environment 1110. The storage 1140 stores instructions of the software 1180 (including instructions and/or data) implementing one or more innovations described herein. Storage 1140 can also store image data, saturation pixel maps, configuration data, or other databases or data structures described herein.

The input device(s) 1150 can be a mechanical, touch-sensing, or proximity-sensing input device such as a keyboard, mouse, pen, touchscreen, or trackball, a voice input device, a scanning device, or another device that provides input to the computing environment 1110. The output device(s) 1160 can be a display, printer, speaker, optical disk writer, or another device that provides output from the computing environment 1110.

The communication port(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1100 can also include a computing cloud 1190 in which instructions implementing all or a portion of the disclosed technology are executed. Any combination of memory 1124, storage 1140, and computing cloud 1190 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein.

General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "acquire," "align," "analyze," "apply," "denoise," "detect," "determine," "display," "disregard," "estimate," "extend," "extract," "form," "generate," "match," "mask," "omit," "output," "preprocess," "process," "produce," "read," "recognize," "register," "store," "transform," "trigger," and "use" to computer operations in a computer system. These terms are high-level descriptions of the actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 11, computer-readable storage media include memory 1124, and storage 1140. The term computer-readable storage media does not include signals and carrier waves. In addition, the term computer-readable storage media does not include communication ports (e.g., 1170).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, Qt, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims and their equivalents.

We claim:

1. An apparatus comprising:
one or more hardware processors with memory coupled thereto;
non-transitory computer-readable media storing instructions to be executed by the hardware processors and further storing a deep neural network (DNN) model;
a plurality of cameras coupled to the hardware processors and supported on a mount to view a common scene from a common direction, wherein the cameras are configured to collect light of respective distinct polarizations; and
a pulsed light source;
wherein the hardware processors are configured to execute the instructions, causing the hardware processors to:
trigger the pulsed light source and the cameras in a timed relationship;
process the light collected by the cameras as raw images to obtain respective first images, wherein two given first images correspond to the pulsed light source being on and off respectively;
use the deep neural network model to determine saturated pixels in one or more of the first images; and
obtain a fused image of the common scene by processing the first images, wherein the saturated pixels are disregarded while obtaining the fused image, the processing the first images further comprising:
reducing glare or reflection from environmental illumination by computing a difference between the two given first images.

2. The apparatus of claim 1, wherein the cameras are stationary.

3. The apparatus of claim 1, wherein the mount is a tracking stage.

4. The apparatus of claim 1, wherein the cameras are first cameras, and the apparatus further comprises:
a plurality of second cameras supported on the mount and configured to collect different respective spectra of light or light with different respective exposures;
wherein the instructions further cause the hardware processors to process the light collected by the second cameras to obtain respective second images; and
wherein the obtaining the fused image further comprises processing the second images.

5. The apparatus of claim 1, wherein the cameras are first cameras, and the apparatus further comprises:
a plurality of second cameras disposed apart from the mount to view the common scene from a second direction different from the common direction, the second cameras configured to collect light of respective polarizations;
wherein the instructions further cause the hardware processors to process the light collected by the second cameras to obtain respective second images; and
wherein the obtaining the fused image further comprises processing the second images.

6. The apparatus of claim 1, wherein the common scene comprises a window glass between the cameras and a subject in the common scene.

7. A system comprising:
one or more hardware processors with memory coupled thereto;
non-transitory computer-readable media storing instructions to be executed by the hardware processors; and
a plurality of cameras coupled to the hardware processors and supported on a mount to view a common scene from a common direction, wherein the cameras collectively provide polarization diversity and one or more of: exposure diversity or spectral diversity;
wherein the hardware processors are configured to execute the instructions, causing the hardware processors to:
process the light collected by the first cameras as raw images to obtain respective first images, wherein two given first images correspond to a pulsed light source being on and off respectively;
process the first images to obtain a fused image of the common scene, wherein processing the first images comprises computing a difference between the two given first images to reduce glare or reflection from environmental illumination;
extract a snippet of the fused image for matching in a face database; and
obtain an identification of a person based on the matching.

8. The system of claim 7, wherein a first group of the cameras provides spectral diversity and a second group of the cameras provides exposure diversity.

9. The system of claim 7, wherein a first group of the cameras provides spectral diversity and a second group of the cameras provides polarization diversity.

10. The system of claim 7, wherein the snippet represents a face transiting the common scene along a path, the cameras are first cameras situated on a first side of the path, and the system further comprises:
one or more second cameras situated on a second side of the path opposite to the first side; and wherein:
the instructions further cause the hardware processors to process light collected by the second camera(s) to obtain one or more respective second images.

11. The system of claim 7, wherein the matching is performed on the snippet.

12. The system of claim 7, wherein the matching is partly based on active cellular handsets in the common scene.

13. The system of claim 10, wherein the obtaining the fused image further comprises processing the one or more second images.

14. The system of claim 10, wherein the fused image is a first fused image, the snippet is a first face snippet, and the instructions further cause the hardware processors to:
process the second images to obtain a second fused image of the common scene;
extract a second face snippet from the second fused image; and
fuse the first face snippet and the second face snippet to obtain a composite face snippet;
wherein the matching is performed on the composite face snippet.

15. A method comprising:
acquiring a plurality of raw images of a scene synchronously at respective cameras, wherein the cameras collectively provide two or more of: exposure diversity, spectral diversity, or polarization diversity, wherein two given raw images correspond to a pulsed light source being on and off respectively;
processing the raw images to extract a face snippet, wherein the processing comprises reducing glare or reflection from environmental illumination by computing a difference from the two given raw images;
transmitting the face snippet over a network to a remote face database; and
receiving, over the network:
  identifications of first and second persons matching the face snippet in the face database; and
  respective probabilities for the matching of the first and second persons.

16. The method of claim 15, wherein
the cameras provide spectral diversity and polarization diversity; and
the processing the raw images comprises:
  deriving a fused image from at least two of the raw images acquired with polarization-diverse cameras and at least two of the raw images acquired with spectrally-diverse cameras; and
  detecting a face in the fused image;
  wherein the extracted face snippet comprises the detected face.

17. The method of claim 15, wherein
the cameras are positioned on a mount to view the scene from a common direction; and
the processing the raw images comprises performing registration based on common features present in the raw images.

* * * * *